Dec. 22, 1964 N. A. MOERMAN 3,162,844

MAGNETIC MEMORY DEVICE FOR COMPARING DIGITAL INFORMATION

Filed Oct. 5, 1959 2 Sheets-Sheet 1

*INVENTOR.*
NATHAN A. MOERMAN
BY Alfred W. Barber
ATTORNEY

INVENTOR.
NATHAN A. MOERMAN
BY Alfred W. Barber
ATTORNEY

United States Patent Office 3,162,844
Patented Dec. 22, 1964

3,162,844

MAGNETIC MEMORY DEVICE FOR COMPARING DIGITAL INFORMATION

Nathan A. Moerman, Roslyn Heights, N.Y., assignor to Potter Instrument Co., Inc., Plainview, N.Y., a corporation of New York Filed Oct. 5, 1959, Ser. No. 844,297
3 Claims. (Cl. 340—174)

The present invention concerns saturable reactors and in particular, saturable reactors suitable for use in high speed digital and logical circuits.

A saturable reactor device particularly suited to digital and logical circuits is a small flat ferrite ring pierced by one or more holes for windings. Such a ring made of "soft" ferrite material carries a signal winding wound in balanced fashion around one hole, a reset winding wound in balanced fashion around a second hole and a control winding wound around the unpierced body of the ring. A second device is a horse-shoe shaped ferrite of "hard" material with a "soft" ferrite piece shunting the open end. The signal winding is wound in balanced fashion around a hole in the soft portion, the reset winding is wound in balanced fashion around a hole in the hard portion and the control winding is wound around the main body of the hard portion.

In both of these saturable reactance devices the object is to act on the impedance of the signal winding which in turn is used to control current from a high frequency current source such as a 5–15 megacycle oscillator. The control winding carries control current which is sufficient to saturate the ferrite at the signal winding portion. The reset winding carries current which in the case of the hard ferrite core will reset the core to a substantially demagnetized condition, and in the case of the all soft ferrite core will inhibit the operation of the control current on the signal winding. These two devices may be used in logical circuits for various purposes. One of the more important uses is for comparison circuits where digital information is stored in the hard (permanent magnet) ferrite devices and is compared with information in digital form transiently applied to the control windings of the soft ferrite devices. The signal winding impedances of the two ferrite devices are compared for match indicating a match between the transient and stored information.

The present invention concerns a device which combines the functions of the hard and soft ferrite devices.

Accordingly one object of the present invention is to provide an integrated saturable reactor device capable of indicating coincidence between information from two different sources.

Another object is to provide a simple inexpensive and very efficient device for indicating coincidence between information from two different sources.

Still another object is to provide the functions and characteristics of a transient and permanent type of saturable reactor in a single integrated device.

A further object is to provide an integrated saturable reactor device of simplified construction and which permits simplified associated circuits for comparable purposes.

These and other objects of the present invention will be evident from the detailed description of the invention given in connection with the various figures of the drawing.

Figure 1:
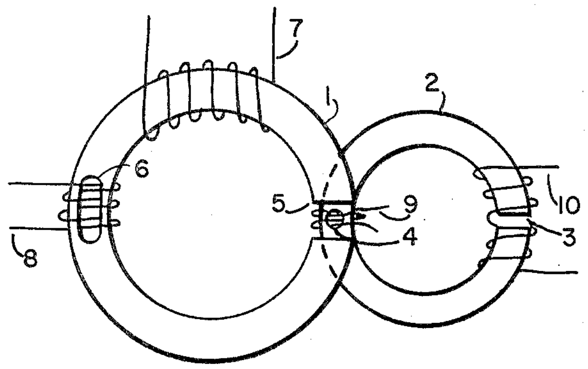
FIG. 1 shows a preferred form of the present invention.

FIG. 1 shows a ring or annulus 1 of high retentivity magnetic material such as a "hard" ferrite which has an open section at 5 and is pierced by a hole 6. Magnetically shunted across open section 5 is a second ring or annulus 2 of low retentivity magnetic material such as "soft" ferrite which has an open section at 3 and a hole 4 within the area of the open section 5. A coil 8 is wound around the sides of hole 6 in reversed directions to form a balanced winding i.e. a winding that is coupled to both sides of hole 6 but is balanced and substantially decoupled with respect to the main body of annulus 1. A coil 9 is, in a similar manner, wound in balanced fashion around the opposite sides of hole 4 but susbtantially uncoupled with respect to the main body of annulus 2. A coil 7 is wound around the body portion of annulus 1 in order to couple to the annulus 1 while a coil 10 is similarly wound around the body of annulus 2 and may preferably embrace the open section 3 in order to couple equally both arms of the body 2. As will be shown below by means of circuit diagrams, this combination has unique characteristics. Current passed through coil 7 will establish a magnetic field around annulus 1 and through the portion of annulus 2 which bridges open section 5. Since annulus 1 is made of high retentivity magnetic material, this field will persist after the current through coil 7 is removed. If a signal is applied through coil 9, it will be impeded more or less in accordance with the state of saturation of annulus 2 in the vicinity of hole 4. This state of saturation will be determined by the field supplied from annulus 1 which, as set forth above, is determined by the current passed through coil 7. When annulus 1 is demagnetized, the section in the vicinity of coil 9 will have a high effective permeability and the impedance of coil 9 to an alternating current signal will be high. When annulus 1 is magnetized, the section at coil 9 will be saturated and the impedance of coil to an alternating current will be low. Thus the impedance of coil 9 may be utilized to indicate the magnetic state of annulus 1 in any suitable manner, many of which are well known to those skilled in the art. Now, if current is passed through coil 10, magnetic flux will be passed around annulus 2. Disregarding for the moment the effect at annulus 1, the flux passed around annulus 2 will lower the impedance of coil 9 by saturating the material in the vicinity of hole 4. However, it has been found that if a field has been established in annulus 1 saturating the core of coil 9, that if a field is established in annulus 2 in the same direction i.e. if both fields are considered to pass flux around annulus 1 and annulus 2 in the same clockwise direction, that the field in annulus 2 across opening 5 will be susbtantially cancelled and the impedance of coil 9 will be maximized. Thus, the impedance of coil 9 will be maximum when the fields in annulus 1 and annulus 2 are zero and when these fields are maximum and in the same direction. The impedance will be low if flux exists in either annulus 1 or annulus 2 alone. A current passed through coil 8 will serve to demagnetize or reset annulus 1 by establishing a cross-magnetizing field.

Figure 2:
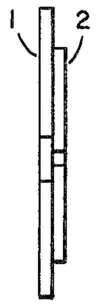
FIG. 2 shows a side view of the form of the invention shown in FIG. 1.

FIG. 2 shows a side view of the annulus 1 and the annulus 2 showing their flat character and the close magnetic coupling between them. For high speed operation the signal current applied to signal coil 9 is of a very high frequency of the order of 5 to 15 megacycles and the size of both annulus 1 and annulus 2 is small of the order of three-eighths of an inch in outside diameter and fifty thousandths of an inch thick. The gap 3 is provided in annulus 2 to increase its reluctance to a point where it does not in effect magnetically short the portion of annulus 2 across opening 5.

Figure 3:
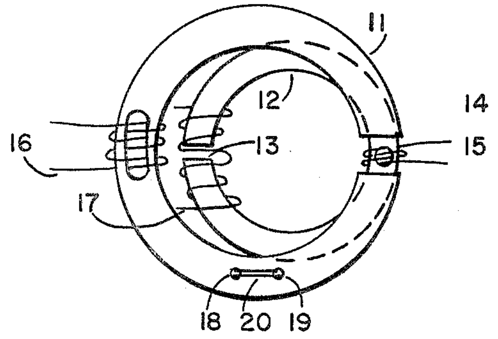
FIG. 3 shows a modified form of the present invention.

FIG. 3 shows a somewhat different arrangement in accordance with the present invention in which the high retentivity annulus is 11, the low retentivity annulus is 12, the first control coil is 16, the second control coil is 17, the signal coil hole is at 14, the signal coil is 15, the gap in 12 is at 13 and the inhibit or reset coil for cross-magnetization is 20 wound through holes 18 and 19 in annulus 11.

Figure 4:
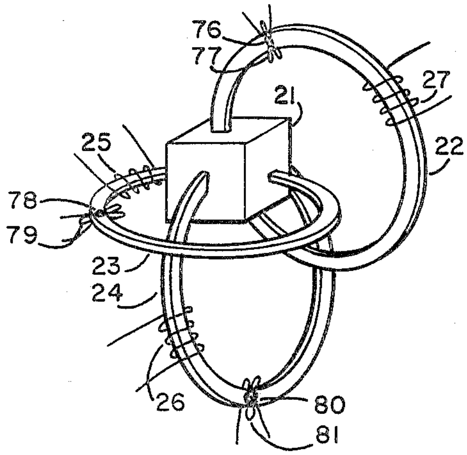
FIG. 4 shows a further modified form of the present invention.

FIG. 4 shows a somewhat generalized form of the present invention in which a cube of high retentivity magnetic material 21 is ringed by low retentivity rings 22, 23 and 24 arranged in three mutually perpendicular directions. These rings carry control coils 27, 25 and 26 and signal coils 77, 79, and 81 wound in balanced fashion around holes 76, 78 and 80 respectively. Current passed through coil 27 will pass magnetic flux around ring 22 and through cube 21 establishing a retained magnetization in the direction of the ring. This field may be detected by means of the impedance of coil 77. Now at the same time rings 23 and 24 will be unmagnetized since the field established by ring 22 is perpendicular to both and hence has substantially zero component in their direction. However, if current is now passed through coil 25, the field in cube 21 will be switched 90 degrees to align with ring 23. This field may be detected by means of signal coil 79 and at the same time the field in ring 22 will be reduced to zero due to this same perpendicular relationship. In the same way, current passed through coil 26 will orient the field in the third direction reducing either of the other two fields, if one exists, to zero. The signal coil 81 will detect this condition.

Figure 5:
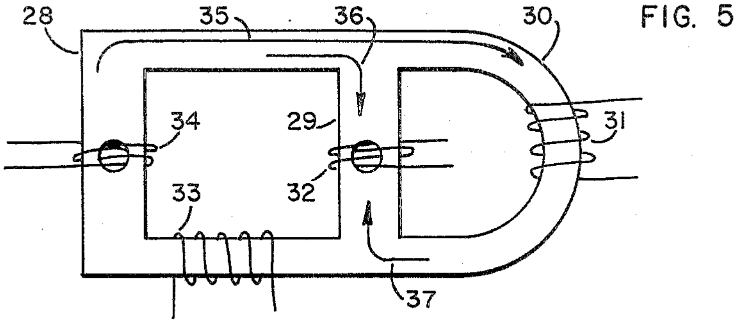
FIG. 5 shows a diagrammatic representation of the device of the present invention.

FIG. 5 shows a diagrammatic representation of the particular forms of the invention shown in FIGS. 1, 2 and 3. The high retentivity ring or annulus is represented by the square cornered portion 28 (to represent square loop material), the low retentivity ring or annulus is represented by the rounded section 30 and the shunt section by the bridged portion 29. The high retentivity ring control coil is shown as 33, the reset winding as 34, the signal coil as 32 and the low retentivity ring control coil as 31. The arrow 36 represents the flux established in 28 by current in coil 33, arrow 37 the flux established by current in coil 31 while arrow 35 shows the resultant flux which bypasses the bridge section 29 and hence also the signal coil 32.

Figure 6:
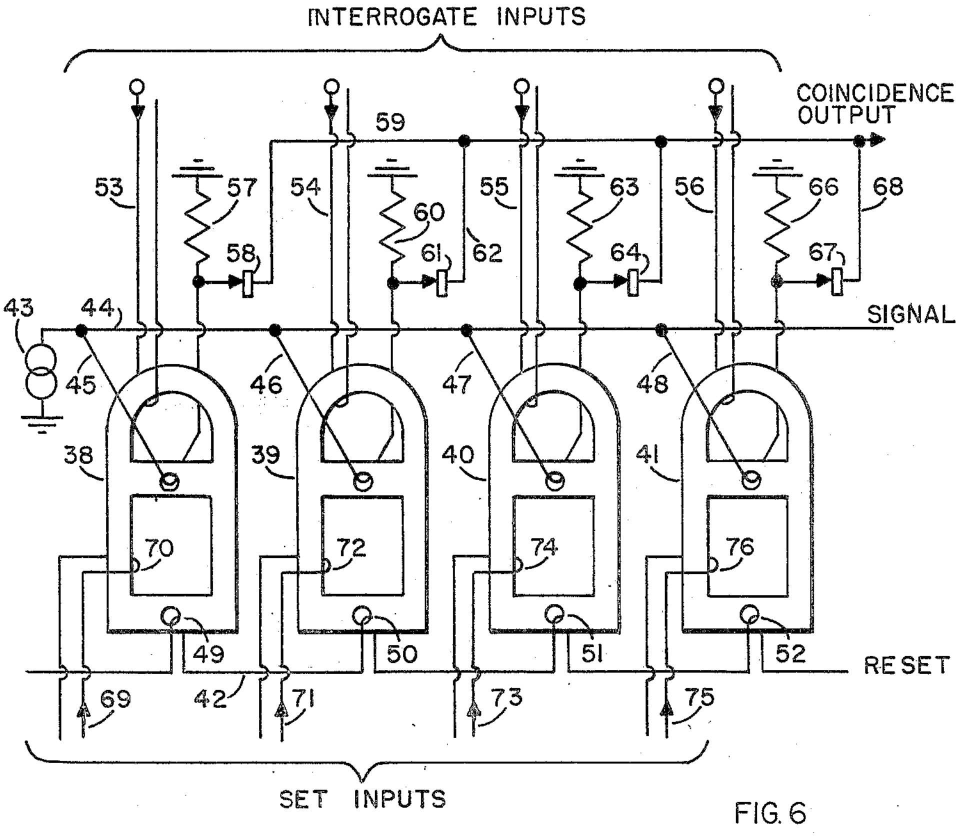
FIG. 6 shows a schematic circuit diagram of one mode of operation of the device of the present invention.

FIG. 6 shows a schematic diagram illustrating one useful combination of four of the above described devices in accordance with the present invention. FIG. 6 shows the four magnetic devices 38, 39, 40 and 41 each constructed in accordance with the device shown in detail in FIG. 5. Each of these magnetic devices is provided with a control or "set" coil 70, 72, 74 and 76 respectively, a second control or "interrogate" coil 53, 54, 55 and 56 respectively, a signal coil 45, 46, 47 and 48 respectively and a "reset" winding 49, 50, 51 and 52 respectively. The signal current is supplied by a high frequency source 43 and over lead 44 to the above designated signal coils which in turn feed detector circuits consisting of rectifiers 58, 61, 64 and 67 and load resistors 57, 60, 63 and 66 and connected to a common output line over lines 59, 62, 65 and 68 respectively. The "set" input coils are connected over lines 69, 71, 73 and 75 respectively. The circuit as above described is used to indicate coincidence between information set in to the magnetic devices over the "set" input lines and transient information supplied at the "interrogate" inputs.

Making reference again to FIG. 5, the impedance of signal coil 32 is high and hence impedes the signal current when the shunt core section 29 is unsaturated. This condition obviously exists if the core 28 has been reset and no signal exists in either of control coils 31 and 33. Thus, if zero is the condition represented by both control coils, the signal coil will have a high impedance. If, on the other hand, a "one" is set into control coil 33, flux passes around the square loop path as indicated by arrow 36, bridge 29 is saturated and signal coil 32 becomes low impedance. Now, if a signal "one" is placed on transient control coil 31 the flux is flipped to the path indicated by arrow 35 and bridge 29 is again unsaturated. This may be explained by noting that control coil 33 alone will produce flux 36 and control coil 31 alone will produce flux 37 and these two fluxes being equal and opposite will cancel in bridge 29 causing a condition of desaturation to exist. As has now been described signal coil 32 will be high impedance when signal coils 31 and 33 are in the same condition i.e. either "zero" or "one." Since section 28 is of high retentivity material, the condition of coil 33 may be stored while coil 31 responds to transient conditions.

FIG. 6 shows how these effects are utilized in a practical circuit. Various signals are set into control coils 70, 72, 74 and 76 for example, "one," "one," "zero" and "one." At this point signal coils 45, 46 and 48 will be low impedance feeding signal to the coincidence output. If, now, signals are fed to interrogate coils 53, 54, 55 and 56, a "one" on 53 will match the "one" on coil 70 and signal coil 45 will go high preventing signal current from reaching rectifier 58 and the coincidence output. Thus if the signals on coils 53, 54, 55 and 56 match one for one the signals previously placed on coils 70, 72, 74 and 76 the coincidence output will drop to a low value indicating a match.

While a few forms of the present invention have been shown and described, it will be apparent to those skilled in the art that many variations and combinations are possible within the spirit and scope of the invention as set forth in the appended claims.

The term "cross-coupled" is used to designate a coil wound in balanced fashion, for example, around a hole in a core like winding 8 of FIG. 1 for producing magnetization across the core and substantially decoupled from a coil around the body of the core as winding 7. Such a coil may be used as a signal coil since its impedance will depend on the state of saturation of the core.

What is claimed is:

1. In an electro-magnetic system the combination of, a first magnetic circuit including a major portion of high retentivity material, a second magnetic circuit coupled to said first circuit and including a major portion of low retentivity material, a first control coil coupled to said first circuit, a second control coil coupled to said second circuit, a signal coil within the coupled portion of said two circuits and a resetting coil cross-coupled to said first magnetic circuit.

2. In an electro-magnetic digital information comparison device, the combination of, an electro-magnetic storage member including a magnetic circuit at least partially composed of relatively high retentivity magnetic material, an electro-magnetic information comparison member including a magnetic circuit at least partially composed of low retentivity magnetic material, said last-mentioned storage member being inductively coupled to the first said storage member at a predetermined point and a signal responsive circuit cross-coupled at the point of coupling for impeding signals when both of said members are demagnetized and when both of said members are saturated.

3. In an electro-magnetic system, the combination comprising, a first magnetic circuit including a member having a gap at a first location and a reduced cross-sectional area at a second location, at least a major portion of said member being formed of a high retentivity material, a second magnetic circuit including a member having a gap at a first location and a reduced cross-sectional area at a second location, at least a major portion of said last-mentioned member being formed of a low retentivity material, the second location of the second circuit being coupled magnetically with the first location of the first circuit, a first winding coupled magnetically with said member of the first circuit, a second winding coupled within the boundaries of the reduced cross-sectional area of the member of the first circuit, a third winding coupled with the reduced cross-sectional area of the member of the second magnetic circuit, and a fourth winding coupled to the member of the second circuit including said gap within the boundaries of the fourth winding.

References Cited by the Examiner

UNITED STATES PATENTS 2,886,790 5/59 Snyder ............. 340—174 X

IRVING L. SRAGOW, *Primary Examiner.*

EVERETT R. REYNOLDS, JOHN T. BURNS, *Examiners.*